US011325305B2

(12) United States Patent
August et al.

(10) Patent No.: US 11,325,305 B2
(45) Date of Patent: May 10, 2022

(54) BUILD PLATE WITH ADHESIVE ISLANDS

(71) Applicant: Arevo, Inc., Milpitas, CA (US)

(72) Inventors: Zachary Aaron August, Santa Clara, CA (US); Christopher Thomas Lee, Sunnyvale, CA (US)

(73) Assignee: Arevo, Inc., Milpitas, CA (US)

( * ) Notice: Subject to any disclaimer, the term of this patent is extended or adjusted under 35 U.S.C. 154(b) by 281 days.

(21) Appl. No.: 16/523,983

(22) Filed: Jul. 26, 2019

(65) Prior Publication Data

US 2021/0023782 A1    Jan. 28, 2021

(51) Int. Cl.
*B29C 64/245* (2017.01)
*B33Y 30/00* (2015.01)
*B29C 64/165* (2017.01)
*B29K 307/04* (2006.01)
*B29K 71/00* (2006.01)
*B29C 64/118* (2017.01)
*B29C 64/40* (2017.01)

(52) U.S. Cl.
CPC .......... *B29C 64/245* (2017.08); *B29C 64/165* (2017.08); *B33Y 30/00* (2014.12); *B29C 64/118* (2017.08); *B29C 64/40* (2017.08); *B29K 2071/00* (2013.01); *B29K 2307/04* (2013.01); *B29K 2905/12* (2013.01)

(58) Field of Classification Search
CPC ... B29C 64/245; B29C 64/165; B29C 64/118; B29C 64/40; B33Y 30/00; B29K 2071/00; B29K 2307/04; B29K 2905/12
USPC ......................................................... 425/470
See application file for complete search history.

(56) References Cited

U.S. PATENT DOCUMENTS

| 9,597,730 | B2 | 3/2017 | Mironets et al. |
| 9,757,881 | B2 | 9/2017 | Tummala et al. |
| 9,782,934 | B2 | 10/2017 | Willis et al. |
| 10,286,451 | B2 * | 5/2019 | Hart ........................ B22F 12/00 |
| 2013/0310507 | A1 | 11/2013 | Tummala et al. |
| 2016/0031010 | A1 | 2/2016 | O'Neill et al. |
| 2016/0067921 | A1 | 3/2016 | Willis et al. |
| 2016/0332387 | A1 | 11/2016 | Jondal et al. |

(Continued)

FOREIGN PATENT DOCUMENTS

EP    3064339 A1    9/2016

OTHER PUBLICATIONS

Requirement for Restriction/Election, U.S. Appl. No. 16/792,150, dated Aug. 31, 2021.

(Continued)

*Primary Examiner* — Joseph S Del Sole
*Assistant Examiner* — Lawrence D. Hohenbrink, Jr.
(74) *Attorney, Agent, or Firm* — McGeary Cukor, LLC; Jason Paul DeMont; Kenneth Ottesen

(57) ABSTRACT

A build plate for 3D printers that facilitates separation of the workpiece from the build plate and yet provides lateral anchoring of the unit cell. The build plate comprises (1) a foundation of a material that the unit cell material will not adhere to or will only weakly adhere to, and (2) a plurality of adhesive islands that provide a lateral anchor for the unit cell. An adhesive island is a hole in the foundation of the build plate that is filled with a plug of material to which the unit cell material will strongly adhere. The number, type, location, and size of the adhesive islands is tailored to provide enough lateral stability where needed, but not more.

19 Claims, 12 Drawing Sheets

(56) References Cited

U.S. PATENT DOCUMENTS

2017/0036403 A1    2/2017  Ruff et al.
2017/0190120 A1*   7/2017  Bloome ................ B33Y 50/02
2017/0036400 A1    9/2017  Loeffler et al.
2017/0333990 A1*  11/2017  Garry ...................... B22F 10/20
2018/0086004 A1*   3/2018  Van Espen .............. B22F 10/47

OTHER PUBLICATIONS

Requirement for Restriction/Election, U.S. Appl. No. 16/792,156, dated Oct. 18, 2021.
Office action, Timothy J. Kennedy, U.S. Appl. No. 16/792,150, dated Jan. 12, 2022.
Office action, Timothy J. Kennedy, U.S. Appl. No. 16/792,156, dated Jan. 12, 2022.

* cited by examiner

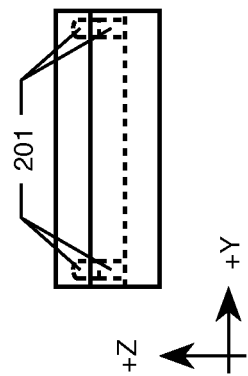
Figure 2c - Build Plate Support 106
(Orthographic Side View)
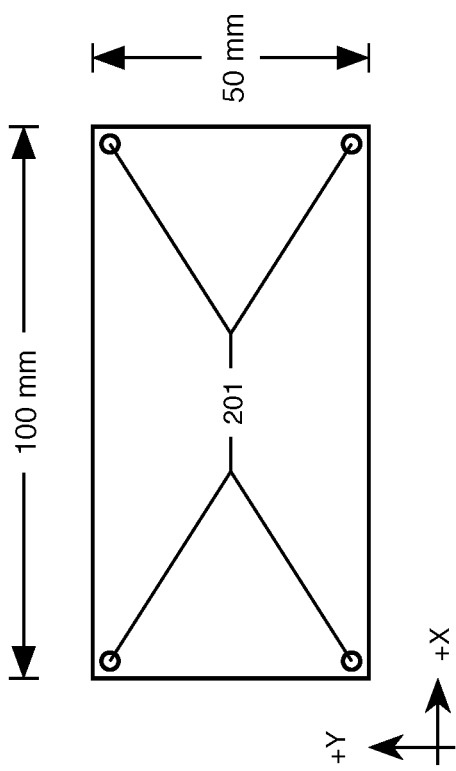
Figure 2a - Build Plate Support 106
(Orthographic Top View)
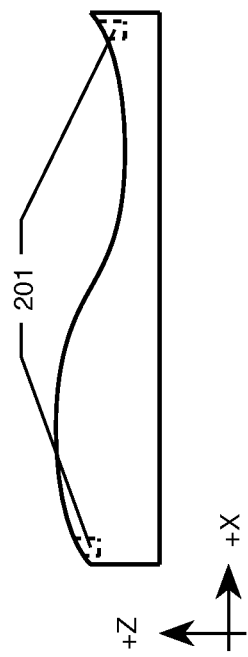
Figure 2b - Build Plate Support 106
(Orthographic Front View)

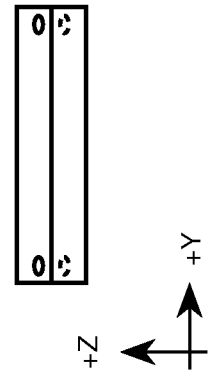
Figure 3c - Build Plate 107 w/o Adhesive Islands (Orthographic Side View)
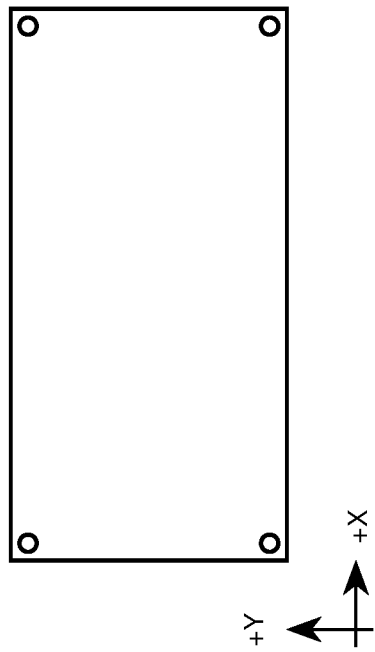
Figure 3a - Build Plate 107 w/o Adhesive Islands (Orthographic Top View)
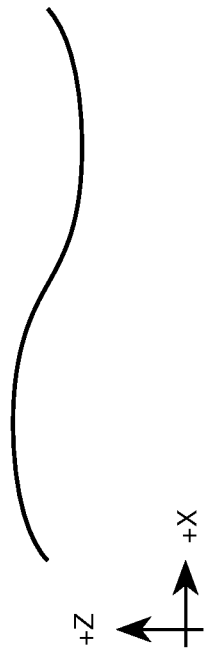
Figure 3b - Build Plate 107 w/o Adhesive Islands (Orthographic Front View)

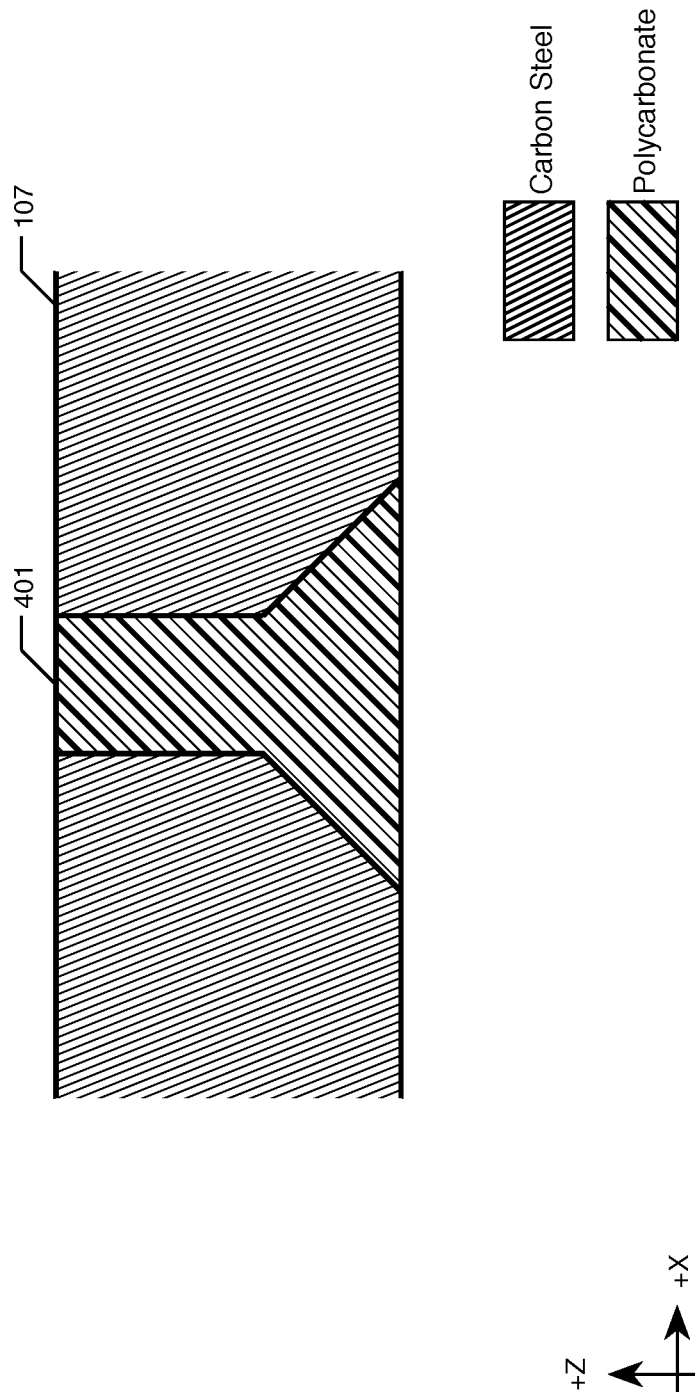

Example of the Layout of Three Filaments to be Deposited on a Build Plate in Relation to Three Circular Adhesive Islands
(Orthographic Top View)

Cross Sectional View of Circular Adhesive Island 401 - Concave Surface
Along Cross-Section AA-AA
(Orthographic Front View)

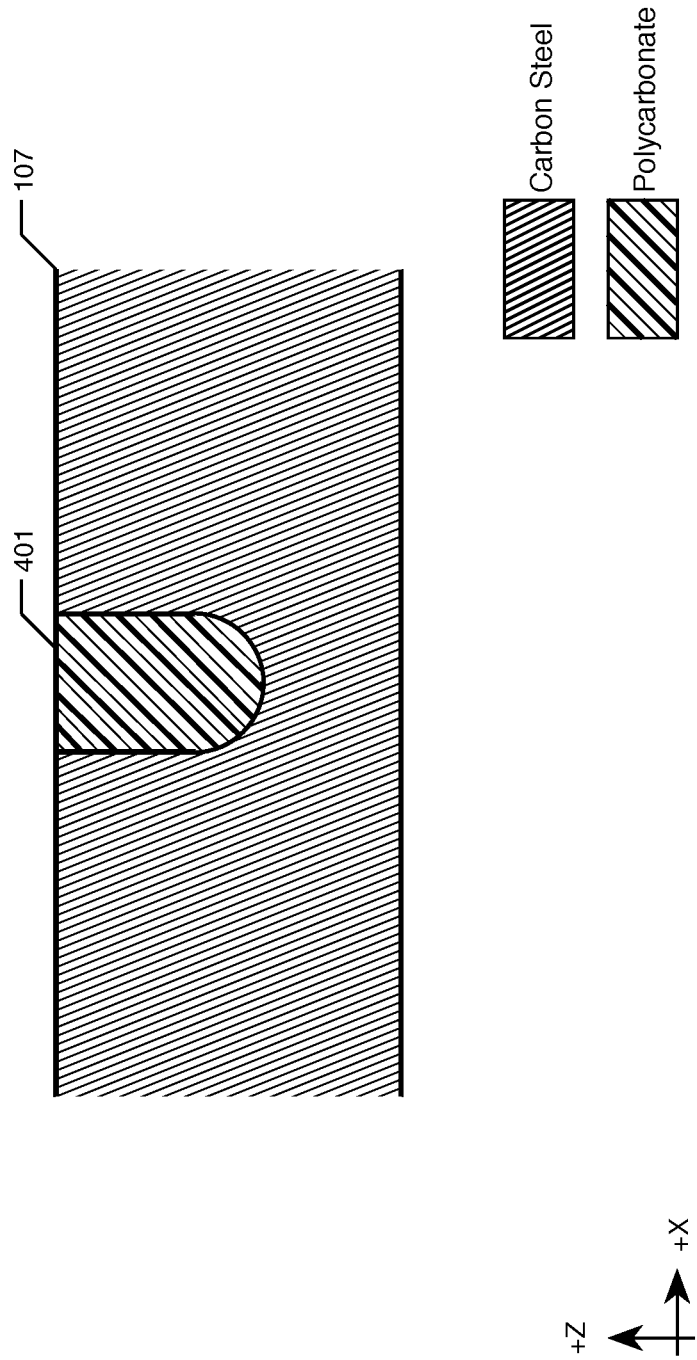

BUILD PLATE WITH ADHESIVE ISLANDS

FIELD OF THE INVENTION

The present invention relates to additive manufacturing in general, and, more particularly, to those additive manufacturing technologies that use build plates.

BACKGROUND OF THE INVENTION

It is well known in the prior art that a building can be constructed with bricks and mortar. Each brick is an independent unit that is made of fired clay and shaped like a cuboid. Therefore, in the field of brick construction, a brick is a "unit cell," fired clay is the "unit cell material" and the cuboid is the "unit cell geometry."

A building of almost any shape and size can be constructed with bricks and mortar, and it is the job of a mason to determine how many bricks are needed, where each brick should go, and in what order the bricks should be deposited.

In the field of additive manufacturing, different technologies can be distinguished by their unit cell, unit cell material and/or unit cell geometry. For example, in fused-deposition modeling the unit cell material is thermoplastic and the unit cell geometry is the bead. A bead of thermoplastic is long, thin, viscous and resembles fresh toothpaste when it is heated above a first temperature and first deposited, and it resembles old dry toothpaste when it cools below a second temperature. With fused-deposition modeling, a workpiece of any shape and size can be constructed, and it is the job of an engineer to determine how many beads are needed, how long each bead should be, where each bead should go, and in what order the beads should be deposited.

In direct-energy deposition the unit cell material is fiber-reinforced thermoplastic, and the unit cell geometry is a segment of filament. A segment of fiber-reinforced thermoplastic filament is long, thin, and resembles a wet spaghetti noodle when it is heated above a first temperature and first deposited, and it resembles a dry spaghetti noodle when it cools below a second temperature. It might be unintuitive, but a workpiece of any shape and size can be constructed by depositing segments of filament, of specific lengths, at the right place, and in the right order.

Because no unit cell can defy gravity, each unit cell must be deposited onto a structural support so that it does not collapse under its own weight. Although many unit cells are deposited onto other, previously-deposited, unit cells, the bottom unit cells must be deposited onto a structural support. In many additive manufacturing technologies, the structural support is a build plate.

SUMMARY OF THE INVENTION

A build plate in accordance with the illustrative embodiment avoids some of the disadvantages of build plates in the prior art. In general, a build plate:
  (i) provides structural support for the unit cell so that it does not collapse under its own weight, and
  (ii) laterally anchors the unit cell so that it does not slide away from where it was deposited.
If a build plate is made from a reasonably strong material, it can provide the requisite structural support.

If a build plate is made from either:
  (i) a material that the unit cell material will strongly adhere to (e.g., polycarbonate, polyetherimide ("PEI"), etc.), or
  (ii) a material that the unit cell material will not adhere to, or will only weakly adhere to, (e.g., carbon steel, stainless steel, etc.) and that has an adhesive coating that is itself strongly adhered to the build plate (e.g., Kapton® polyimide film, Magigo™ 3D Printer Bed Adhesion Solution, hairspray, etc.),
then the build plate can laterally anchor the unit cell. Although the adhesion is beneficial during fabrication of a workpiece, the fact that the workpiece is strongly adhered to either the workpiece or a coating on the workpiece is disadvantageous after fabrication because it inhibits separating the finished workpiece from the build plate. In particular, the process of separating the finished workpiece from the build plate can damage the workpiece; it can damage the build plate, and it is time consuming.

A build plate in accordance with the illustrative embodiment ameliorates this problem. The foundation of the build plate is made from a reasonably strong material that the unit cell material will not adhere to or will only weakly adhere to (e.g., carbon steel, stainless steel, etc.). This ensures:
  (i) that the build plate can provide structural support, and
  (ii) that the workpiece material will not adhere to, or will only weakly adhere to the foundation of the build plate.

The build plate can be either planar or non-planar, but in either case it has an obverse surface and a reverse surface. To provide a mechanism for laterally anchoring the unit cell, the obverse surface of the build plate (i.e., the side of the build plate onto which the workpiece is fabricated) is populated with a plurality of "adhesive islands" (as shown in FIGS. 4a and 4b). An adhesive island is a laterally-immovable plug of material that the unit cell material will strongly adhere to. For the purposes of this specification, the quantitative measure of how weakly or strongly two materials adhere is given by the tensile pull-off adhesive strength.

In accordance with the illustrative embodiment, an adhesive island is made by drilling, milling, or molding a hole in the obverse surface of the foundation of the build plate and by filling the hole with a plug of thermoplastic to which the unit cell material will strongly adhere. An adhesive island can be either:
  (i) a blind hole that only pierces the obverse surface of the foundation of the build plate (as shown in FIG. 11), or
  (ii) a thru-hole that pierces both the obverse surface and the reverse surface of the foundation of the build plate (as shown in FIGS. 5, 9, and 10).

In accordance with the illustrative embodiment, the adhesive islands are thru-holes that comprise a chamfer on the reverse surface (as shown in FIG. 5). The purpose of the chamfer is to ensure that the weakest cross-section of the adhesive island is at or near the obverse surface of the build plate.

The plug of thermoplastic can be flush with the obverse surface of the build plate (as shown in FIG. 5), or it can be concave and below the obverse surface (as shown in FIG. 9), or it can be convex and above the obverse surface (as shown in FIG. 10).

Each adhesive island can be circular, elongate, or curved (as shown in FIGS. 4a and 4b), and the location and size of each adhesive island can be tailored to the workpiece. In particular, the number, type, location, and size of the adhesive islands is purposely chosen to provide enough lateral stability where needed, but not more, which facilitates separation of the workpiece from the build plate. In some embodiments, a plurality of adhesive islands are arranged in a rectangular lattice (as shown in FIGS. 4a and 4b), a hexagonal lattice (as shown in FIGS. 4a and 4b), or any other regular lattice.

A workpiece deposited on the illustrative build plate can be separated in three ways:
(i) by shearing the workpiece from the adhesive islands with a thin piano wire, or, alternatively,
(ii) by cleaving the workpiece from the build plate with a wedge (i.e., successively stretching and rupturing the adhesive islands from workpiece), or, alternatively,
(iii) by heating the adhesive islands above their melting point but below the glass transition temperature of the thermoplastic in the workpiece.

BRIEF DESCRIPTION OF THE DRAWINGS

FIG. 2a depicts an orthogonal top view of build plate support 106 in accordance with the illustrative embodiment of the present invention.

FIG. 2b depicts an orthogonal front view of build plate support 106 in accordance with the illustrative embodiment of the present invention.

FIG. 2c depicts an orthogonal side view of build plate support 106 in accordance with the illustrative embodiment of the present invention.

FIG. 3a depicts an orthogonal top view of build plate 107 in accordance with the illustrative embodiment before any holes or adhesive islands have been added.

FIG. 3b depicts an orthogonal front view of build plate 107 in accordance with the illustrative embodiment before any holes or adhesive islands have been added.

FIG. 3c depicts an orthogonal side view of build plate 107 in accordance with the illustrative embodiment before any holes or adhesive islands have been added.

FIG. 5 depicts an orthogonal front view of circular adhesive island 401 along cross-section AA-AA, in which the plug is flush with the obverse surface of build plate 107.

FIG. 11 depicts an orthogonal front view of circular adhesive island 401 along cross-section AA-AA, in which the hole is a blind hole.

DEFINITIONS

Tensile Pull-Off Adhesive Strength—for the purposes of this specification, the term "tensile pull-off adhesive strength" has the basic dimensions of force/area and is typically measured in Pascals.

DETAILED DESCRIPTION

Figure 1:
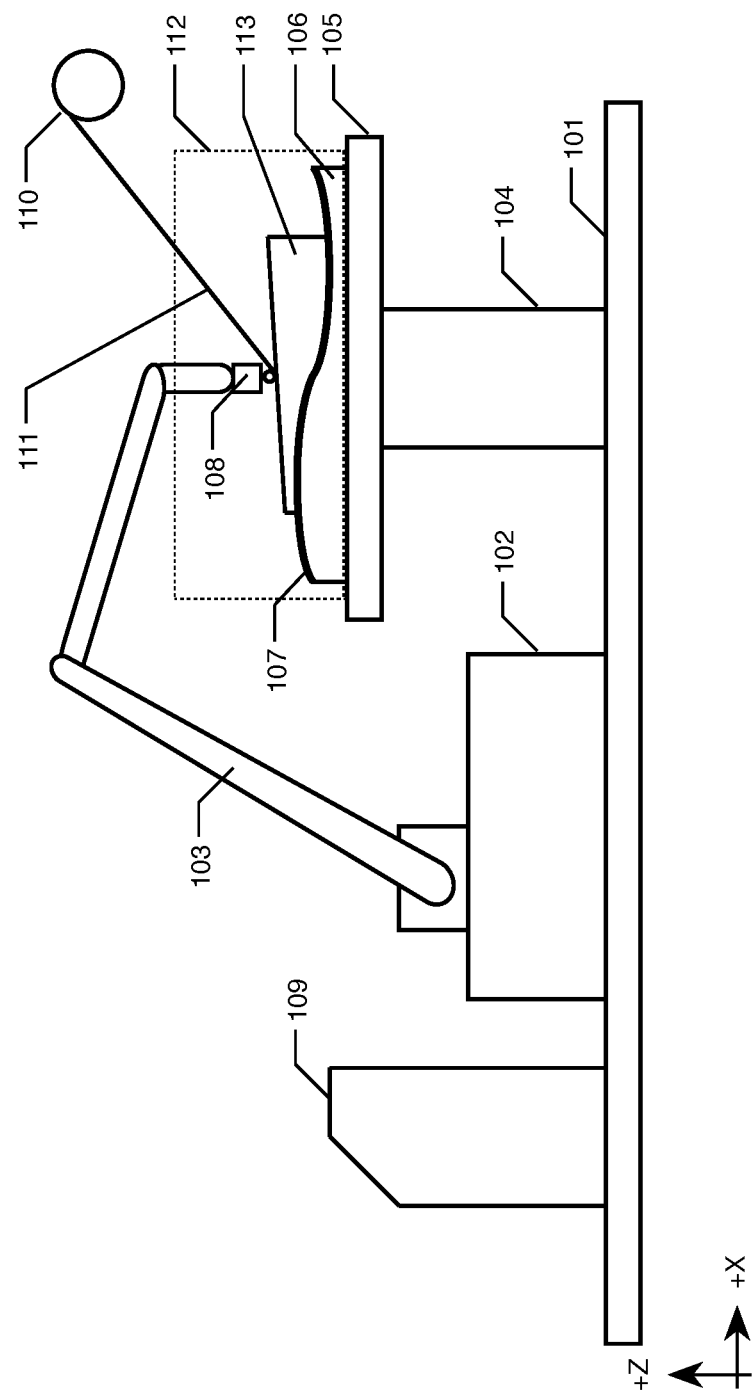
FIG. 1 depicts an illustration of the salient components of additive manufacturing system 100 in accordance with the illustrative embodiment of the present invention.

FIG. 1 depicts an illustration of the salient components of additive manufacturing system 100 in accordance with the illustrative embodiment of the present invention. Additive manufacturing system 100 comprises: platform 101, robot mount 102, robot arm 103, table support 104, table 105, build plate support 106, build plate 107, deposition head 108, controller 109, filament reel 110, filament 111, build volume 112, and workpiece 113. The purpose of manufacturing system 100 is to fabricate workpiece 113 by successively depositing segments of filament 111 on top of each other.

Platform 101 is a rigid structure that ensures that the relative spatial relationship of robot mount 102, robot arm 103, and deposition head 108 are maintained and known with respect to table support 104, table 105, build plate support 106, and build plate 107. It will be clear to those skilled in the art how to make and use platform 101.

Robot mount 102 is a rigid and stable support for robot arm 103. It will be clear to those skilled in the art how to make and use robot mount 102.

Robot arm 103 comprises a six-axis mechanical arm that is under the control of controller 109. A non-limiting example of robot arm 103 is the IRB 4600 robot offered by ABB. Robot arm 103 is capable of depositing a segment of filament 111 from any point in build volume 112 to any other point in build volume 112 along any line, any planar curve, or any non-planar curve. Robot arm 103 can move deposition head 108 in:
  i. the +X direction,
  ii. the −X direction,
  iii. the +Y direction,
  iv. the −Y direction,
  v. the +Z direction,
  vi. the −Z direction, and
  vii. any combination of i, ii, iii, iv, v, and vi,
while rotating the approach angle of deposition head 108 around any line, any planar curve, and any non-planar curve within build volume 112. It will be clear to those skilled in the art how to make and use robot arm 103.

Table support 104 is a rigid and stable support for table 105, build plate support 106, build plate 107 and workpiece 113. Table support 104 comprises a stepper motor, under the control of controller 109, that is capable of rotating table 105 (and, consequently build plate support 106, build plate 107 and workpiece 113) around an axis that is normal to the X-Y plane. It will be clear to those skilled in the art how to make and use table support 104.

Table 105 is a rigid support made of metal onto which build plate support 106 is rigidly affixed so that it (and by implication build plate 107 and workpiece 113) cannot move or rotate independently of table 105. In accordance with the illustrative embodiment, the top surface of table 105 is flat with threaded holes that enable build plate support 106 to be rigidly bolted onto table 105 so as to implicitly register the location of build plate support 106 in the coordinate system of table 105. It will be clear to those skilled in the art, after reading this disclosure, how to make and use table 105.

Build plate support 106 is rigid support for build plate 107 and by implication workpiece 113. In accordance with the illustrative embodiment, build plate support 106 comprises a single piece of milled aluminum. It will be clear to those skilled in the art, after reading this disclosure, how to make and use alternative embodiments of the present invention in which build plate support 106 comprises a different material or different combination of materials. Furthermore, it will be clear to those skilled in the art, after reading this disclosure, how to make and use alternative embodiments of the present invention in which build plate support 106 comprises a plurality of cooperating pieces.

In accordance with the illustrative embodiment, the top surface of build plate support 106 is congruent with the reverse surface of build plate 107. In accordance with the illustrative embodiment, the top surface of build plate support 106 is non-planar and is continuously differentiable. It will be clear to those skilled in the art, after reading this disclosure, how to make and use alternative embodiments of the present invention in which the top surface is planar. Furthermore, it will be clear to those skilled in the art, after reading this disclosure, how to make and use alternative embodiments of the present invention in which the top surface is not continuously differentiable (i.e., contains discontinuities, gaps, etc.).

In accordance with the illustrative embodiment, build plate support 106 comprises threaded holes that enable build plate 107 to be rigidly bolted onto build plate support 106 so that:

(i) build plate 107 is fully supported to prevent it from bending, warping, twisting, or being lifted up during the fabrication of workpiece 113, and (ii) build plate is implicitly registered in the coordinate system of table 105, and (iii) the bolts holding build plate 107 to build plate support 106 can be fully accessed after workpiece 113 is fabricated onto build plate 107 (i.e., the presence of workpiece 113 on the obverse surface of build plate 107 does not impede unbolting build plate 107 from build plate support 106).

Build plate support 106 is described in detail below and in the accompanying figures.

Build plate 107 is the object onto which workpiece 113 is deposited. In accordance with the illustrative embodiment, build plate 107 comprises:

(i) a non-planar foundation of metal, and (ii) a plurality of strategically-located adhesive islands, each of which comprises a plug of thermoplastic.

In accordance with the illustrative embodiment, the metal is carbon steel, but it will be clear to those skilled in the art, after reading this disclosure, how to make and use alternative embodiments in which the foundation is made of a different material, for example and without limitation, a different metal or metal alloy (e.g., steel, stainless steel, tungsten, copper, nickel, etc.) or a non-metal (e.g., a thermoplastic that has a non-stick coating (e.g., polytetrafluoroethylene, etc.).

In accordance with the illustrative embodiment, the plugs of thermoplastic are a polycarbonate, but it will be clear to those skilled in the art, after reading this disclosure, how to make and use alternative embodiments of the present invention in which the plugs of thermoplastic are a different material (e.g., acrylonitrile butadiene styrene (ABS), polystyrene, polyetherimide (Ultem®), polyetherimide (PEI), etc.).

In accordance with the illustrative embodiment, the reverse surface of build plate 107 is congruent with the top surface of build plate support 106 and the obverse surface of build plate 107 is congruent with the bottom surface of workpiece 113.

Build plate 107 is described in detail below and in the accompanying figures Deposition head 108 comprises hardware necessary to deposit a segment of filament 111 along any line, any planar curve, or any non-planar curve in build volume 112. Deposition head 108 is described in detail in U.S. Pat. No. 10,076,870, entitled "Filament Guide," issued on Sep. 18, 2018 (attorney docket 3019-142us1), which is incorporated by reference for the purposes of describing deposition head 108. Furthermore, ancillary details about deposition head 108 are described in (i) U.S. Pat. No. 10,195,786, entitled "Filament Heating in 3D Printing Systems," issued on Feb. 5, 2019 (attorney docket 3019-115us1); and (ii) U.S. Pat. No. 10,046,511, entitled "Alleviating Torsional Forces on Fiber-Reinforced Thermoplastic Filament," issued on Aug. 14, 2018 (attorney docket 3019-143us1); and (iii) pending U.S. patent application Ser. No. 15/854,676, entitled "Depositing Arced Portions of Fiber-Reinforced Thermoplastic Filament," filed Dec. 26, 2017 (attorney docket 3019-157us1); and (iv) pending U.S. patent application Ser. No. 16/505,541, entitled "Adding a Segment of Fiber-Reinforced Thermoplastic Filament in a Curve," filed Jul. 8, 2019 (attorney docket 3019-201us1);

all of which are incorporated by reference. It will be clear to those skilled in the art, after reading this disclosure and the incorporated disclosures, how to make and use deposition head 108.

Controller 109 comprises the hardware and software necessary to direct robot arm 103, deposition head 108, and table support 104 to fabricate workpiece 113. It will be clear to those skilled in the art how to make and use controller 109.

Filament reel 110 is a circular reel that stores 1000 meters of filament 111 and feeds that filament to deposition head 108. It will be clear to those skilled in the art how to make and use filament reel 110.

Filament 111 is a cylindrical towpreg of contiguous 12K carbon fiber that is impregnated with thermoplastic resin. The cross-section of filament 111 is circular, and it has a diameter of 200 µm.

In accordance with the illustrative embodiment, filament 111 comprises contiguous carbon fiber, but it will be clear to those skilled in the art, after reading this disclosure, how to make and use alternative embodiments of the present invention in which filament 111 has a different fiber composition.

It will be clear to those skilled in the art, after reading this disclosure, how to make and use alternative embodiments of the present invention in which filament 111 comprises a different number of fibers (e.g., 1K, 3K, 6K, 24K, etc.). It will be clear to those skilled in the art, after reading this disclosure, how to make and use alternative embodiments of the present invention in which the fibers in filament 111 are made of a different material (e.g., fiberglass, aramid, carbon nanotubes, etc.).

In accordance with the illustrative embodiments, the thermoplastic is, in general, a semi-crystalline polymer and, in particular, the polyaryletherketone (PAEK) known as polyetherketone (PEK). In accordance with some alternative embodiments of the present invention, the semi-crystalline material is the polyaryletherketone (PAEK), polyetheretherketone (PEEK), polyetherketoneketone (PEKK), polyetheretherketoneketone (PEEKK), or polyetherketoneetherketoneketone (PEKEKK). As those who are skilled in the art will appreciate after reading this specification, the disclosed annealing process, as it pertains to a semi-crystalline polymer in general, takes place at a temperature that is above the glass transition temperature Tg.

In accordance with some alternative embodiments of the present invention, the semi-crystalline polymer is not a polyaryletherketone (PAEK) but another semi-crystalline thermoplastic (e.g., polyamide (PA), polybutylene terephthalate (PBT), poly(p-phenylene sulfide) (PPS), etc.) or a mixture of a semi-crystalline polymer and an amorphous polymer.

When the filament comprises a blend of an amorphous polymer with a semi-crystalline polymer, the semi-crystalline polymer can one of the aforementioned materials and the amorphous polymer can be a polyarylsulfone, such as polysulfone (PSU), polyethersulfone (PESU), polyphenylsulfone (PPSU), polyethersulfone (PES), or polyetherimide (PEI). In some additional embodiments, the amorphous polymer can be, for example and without limitation, polyphenylene oxides (PPOs), acrylonitrile butadiene styrene (ABS), methyl methacrylate acrylonitrile butadiene styrene copolymer (ABSi), polystyrene (PS), or polycarbonate (PC). As those who are skilled in the art will appreciate after reading this specification, the disclosed annealing process, as it pertains to a blend of an amorphous polymer with a semi-crystalline polymer, takes place generally at a lower temperature than a semi-crystalline polymer with the same glass transition temperature; in some cases, the annealing process can take place at a temperature slightly below the glass transition temperature.

When the filament comprises a blend of an amorphous polymer with a semi-crystalline polymer, the weight ratio of semi-crystalline material to amorphous material can be in the range of about 50:50 to about 95:05, inclusive, or about 50:50 to about 90:10, inclusive. Preferably, the weight ratio of semi-crystalline material to amorphous material in the blend is between 60:40 and 80:20, inclusive. The ratio selected for any particular application may vary primarily as a function of the materials used and the properties desired for the printed workpiece.

In some alternative embodiment of the present invention, the filament comprises a metal. For example, and without limitation, the filament can be a wire comprising stainless steel, Inconel (nickel/chrome), titanium, aluminum, cobalt chrome, copper, bronze, iron, precious metals (e.g., platinum, gold, silver, etc.).

Build volume 112 is the region in three-dimensional space in which robot arm 103 and deposition head 108 are capable of depositing filament 111. In accordance with the illustrative embodiment, the obverse surface of build plate 107 exists completely within build volume 112.

Workpiece 113 is an object that is fabricated by additive manufacturing system 100 on build plate 107. It will be clear to those skilled in the art how to make and use workpiece 113.

FIGS. 2a, 2b, and 2c depict orthographic front, side, and top views of build plate support 106 in accordance with the illustrative embodiment.

In accordance with the illustrative embodiment, build plate support 106 has a rectangular footprint and is 100 mm wide (i.e., in the Δx direction) and 50 mm deep (i.e., in the Δy direction). The bottom surface of build plate support 106 (i.e., the surface adjacent to table 105) is planar, adjacent to table 105, and parallel to table 105. The top surface of build plate support 106 (i.e., the surface adjacent to build plate 107) is non-planar, continuous (i.e., comprises no discontinuities), and described by the equation:

$$z = s(x, y) = 10 \sin\left(\frac{2\pi x}{100}\right) \text{ mm} \quad \text{Eq. (1)}$$

where x is a real number in the range 0≤x≤100.

Although build plate support 106 has a rectangular footprint, it will be clear to those skilled in the art, after reading this disclosure, how to make and use alternative embodiments of the present invention in which the build plate supports has any footprint.

Although build plate support 106 has a footprint of 100 mm×50 mm, it will be clear to those skilled in the art, after reading this disclosure, how to make and use build plate supports of any size.

Although build plate support 106 has a bottom surface that is planar, it will be clear to those skilled in the art, after reading this disclosure, how to make and use alternative embodiments of the present invention in which the bottom surface has any form (e.g., planar, non-planar, irregular, convex, concave, hemispherical, etc.) so long as it is rigid, fully supported by table 105, and is registered or registerable to table 105.

Although build plate support 106 has a bottom surface that is continuous, it will be clear to those skilled in the art, after reading this disclosure, how to make and use alternative embodiments of the present invention in which the bottom surface comprises one or more discontinuities.

Although build plate support 106 has a bottom surface that is adjacent to table 105, it will be clear to those skilled in the art, after reading this disclosure, how to make and use alternative embodiments of the present invention in which one or more portions of the bottom surface are not adjacent to the build plate.

Although build plate support 106 has a top surface that is non-planar, it will be clear to those skilled in the art, after reading this disclosure, how to make and use alternative embodiments of the present invention in which the top surface has any form (e.g., planar, irregular, convex, concave, hemispherical, etc.).

Although build plate support 106 has a top surface that is continuous, it will be clear to those skilled in the art, after reading this disclosure, how to make and use alternative embodiments of the present invention in which the top surface comprises one or more discontinuities.

In accordance with the illustrative embodiment, build plate support 106 comprises four threaded blind holes 201, which will be used to accept the bolts that affix build plate 107 to build plate support 106. It will be clear to those skilled in the art how to make and use threaded blind holes 201.

FIGS. 3a, 3b, and 3c depict orthographic front, side, and top views of build plate 107 without any adhesive islands.

In accordance with the illustrative embodiment, the foundation of build plate 107 is made from a material that the unit cell material will not adhere to or will only weakly adhere to (e.g., carbon steel, stainless steel, etc.). In accordance with the illustrative embodiment, the material is a metal, in general, and is carbon steel in particular. It will be clear to those skilled in the art, after reading this specification, how to make and use alternative build plates of any thickness.

In accordance with the illustrative embodiment, build plate 107 has a (projected) rectangular footprint that is 100 mm wide (i.e., in the Δx direction) and 50 mm deep (i.e., in the Δy direction), and the reverse surface of build plate 107 is congruent to the top surface of build plate support 106.

Although build plate 107 has a (projected) rectangular footprint, it will be clear to those skilled in the art, after reading this disclosure, how to make and use alternative build plates that have any footprint.

Although build plate 107 has a footprint of 100 mm×50 mm, it will be clear to those skilled in the art, after reading this disclosure, how to make and use alternative build plates of any size.

Although build plate 107 has a reverse surface that is continuous, it will be clear to those skilled in the art, after reading this disclosure, how to make and use alternative build plates in which the reverse surface comprises one or more discontinuities.

Although build plate 107 has a reverse surface that is adjacent to build plate support 106, it will be clear to those skilled in the art, after reading this disclosure, how to make and use alternative embodiments of the present invention in which one or more portions of the reverse surface are not adjacent to the build plate support.

Although build plate 107 has an obverse surface that is non-planar, it will be clear to those skilled in the art, after reading this disclosure, how to make and use alternative build plates in which the obverse surface has any form (e.g., planar, irregular, convex, concave, hemispherical, etc.).

Although build plate 107 has an obverse surface that is continuous, it will be clear to those skilled in the art, after reading this disclosure, how to make and use alternative build plates in which the obverse surface comprises one or more discontinuities.

In accordance with the illustrative embodiment, build plate 107 comprises four threaded blind holes 301, which accept bolts that affix build plate 107 to build plate support 106. It will be clear to those skilled in the art how to make and use threaded blind holes 201.

Figure 4A:
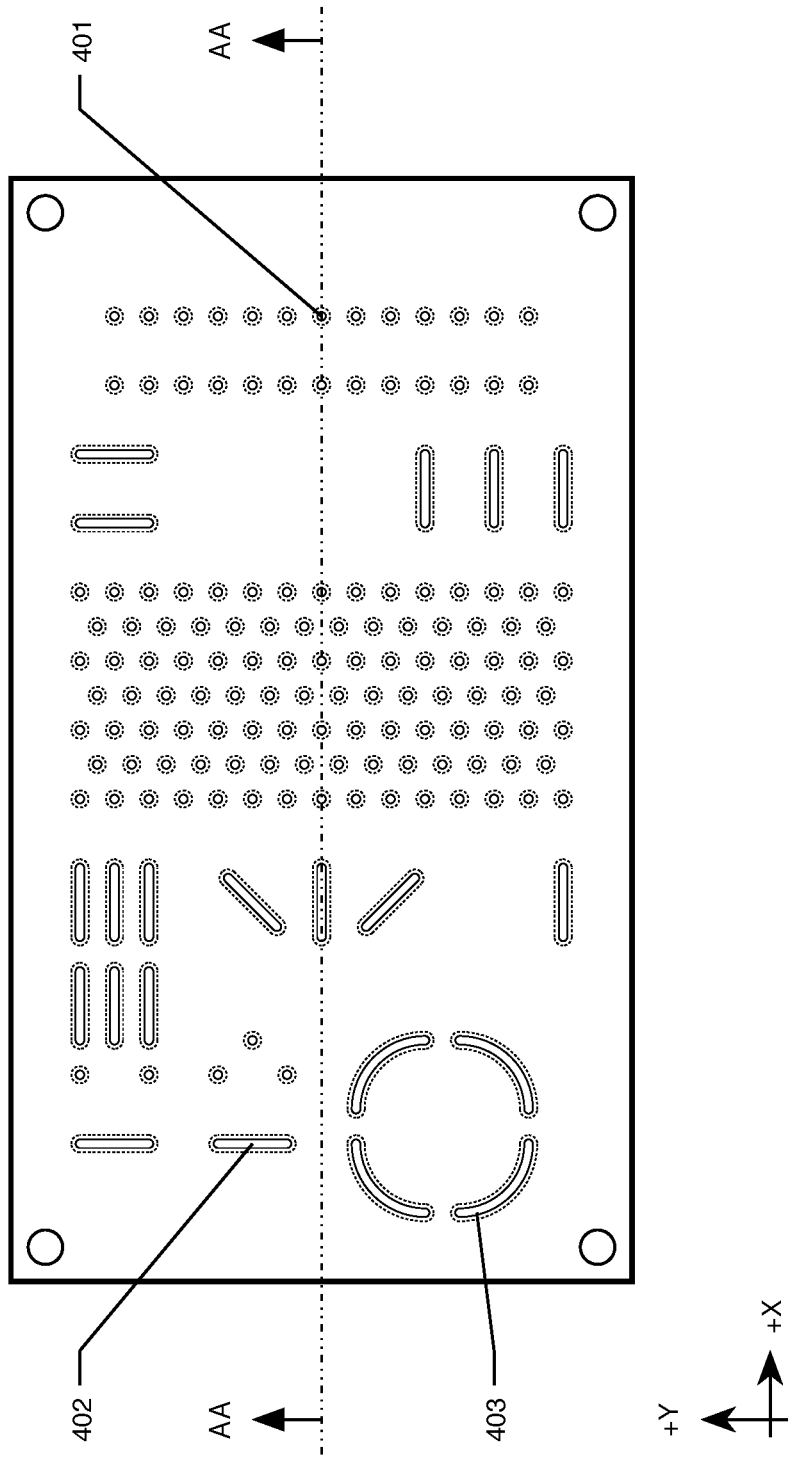
FIG. 4a depicts an orthogonal top view of build plate 107 in accordance with the illustrative embodiment after the adhesive islands have been added.
Figure 4B:
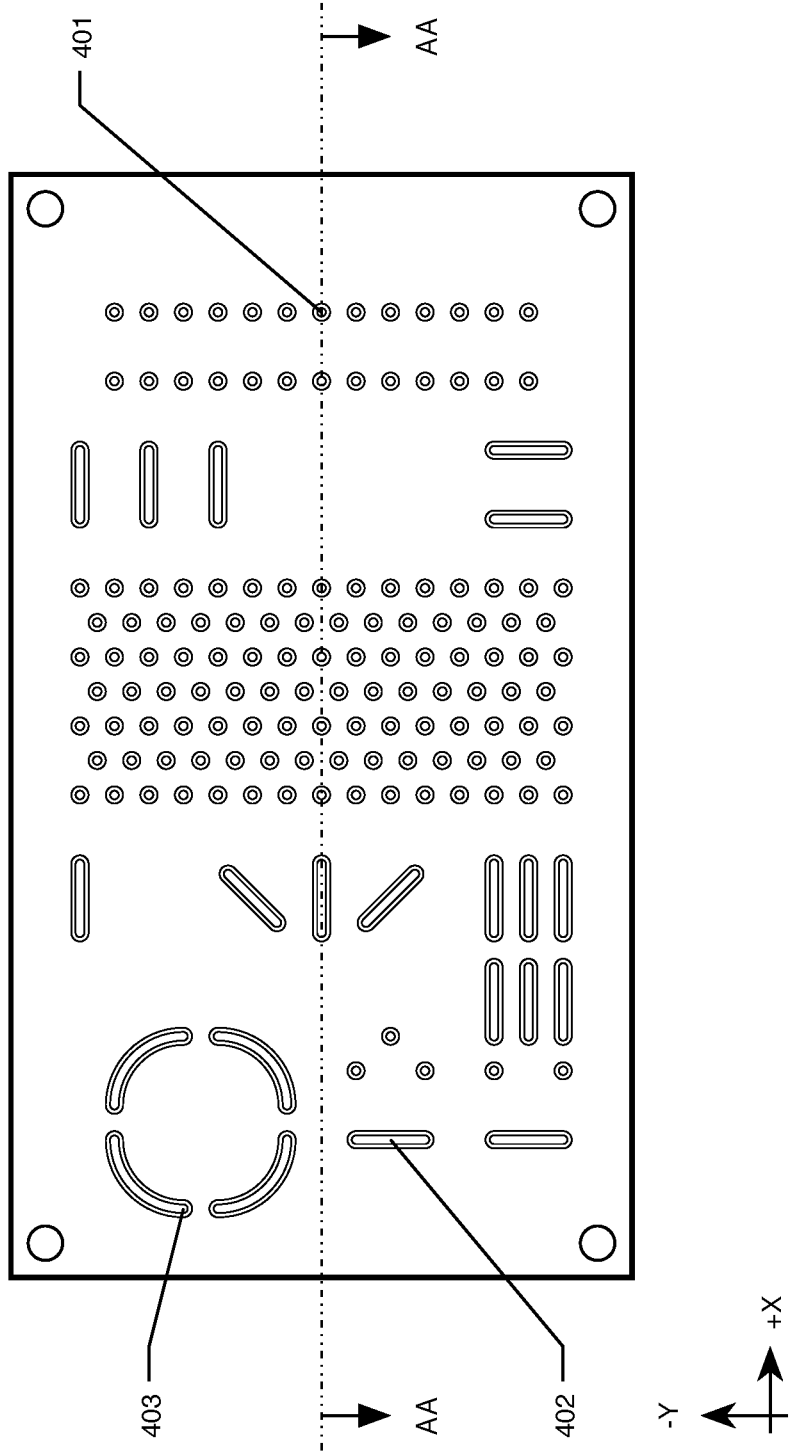
FIG. 4b depicts an orthogonal bottom view of build plate 107 in accordance with the illustrative embodiment after the adhesive islands have been added.

FIGS. 4a and 4b depict orthogonal top and bottom views, respectively, of build plate 107 with the adhesive islands.

Build plate 107 as depicted in FIGS. 4a and 4b comprises 146 adhesive islands positioned as shown. It will be clear to those skilled in the art, after reading this disclosure, how to make and use alternative build plates that comprise any number of adhesive islands. Furthermore, it will be clear to those skilled in the art, after reading this disclosure, how to make and use alternative build plates in which the adhesive islands are positioned in any spatial arrangement.

In accordance with the illustrative embodiment, build plate 107 comprises three types of adhesive islands:
  (i) circular adhesive islands, such as circular adhesive island 401, which have a circular (or approximately circular) footprint; and
  (ii) elongate adhesive islands, such as elongate adhesive island 402, which have an elongate footprint; and
  (iii) curved adhesive islands, such as curved adhesive island 403, which have a curved footprint.

It will be clear to those skilled in the art, after reading this disclosure, how to make and use alternative build plates that comprise any combination of circular, elongate, and curved adhesive islands.

In accordance with the illustrative embodiment, build plate 107 comprises 102 circular adhesive islands, 12 elongate adhesive islands, and 2 curved adhesive islands. It will be clear to those skilled in the art, after reading this disclosure, how to make and use alternative build plates that comprise any number of circular adhesive islands, any number of elongate adhesive islands, and any number of curved adhesive islands.

In accordance with the illustrative embodiment each adhesive island is a countersunk thru-hole with a 90° chamfer angle on the reverse surface. It will be clear to those skilled in the art, after reading this disclosure, how to make and use alternative build plates in which one or more adhesive islands comprises a blind hole in the obverse surface (such as that shown in FIG. 11).

In accordance with the illustrative embodiment, each thru-hole and blind hole is filled with a plug of thermoplastic to which filament 111 will strongly adhere. In particular, the thermoplastic is polycarbonate. It will be clear to those skilled in the art, after reading this disclosure, how to make and use alternative build plates in which each thru-hole and blind hole is filled with a different material.

Figure 9:
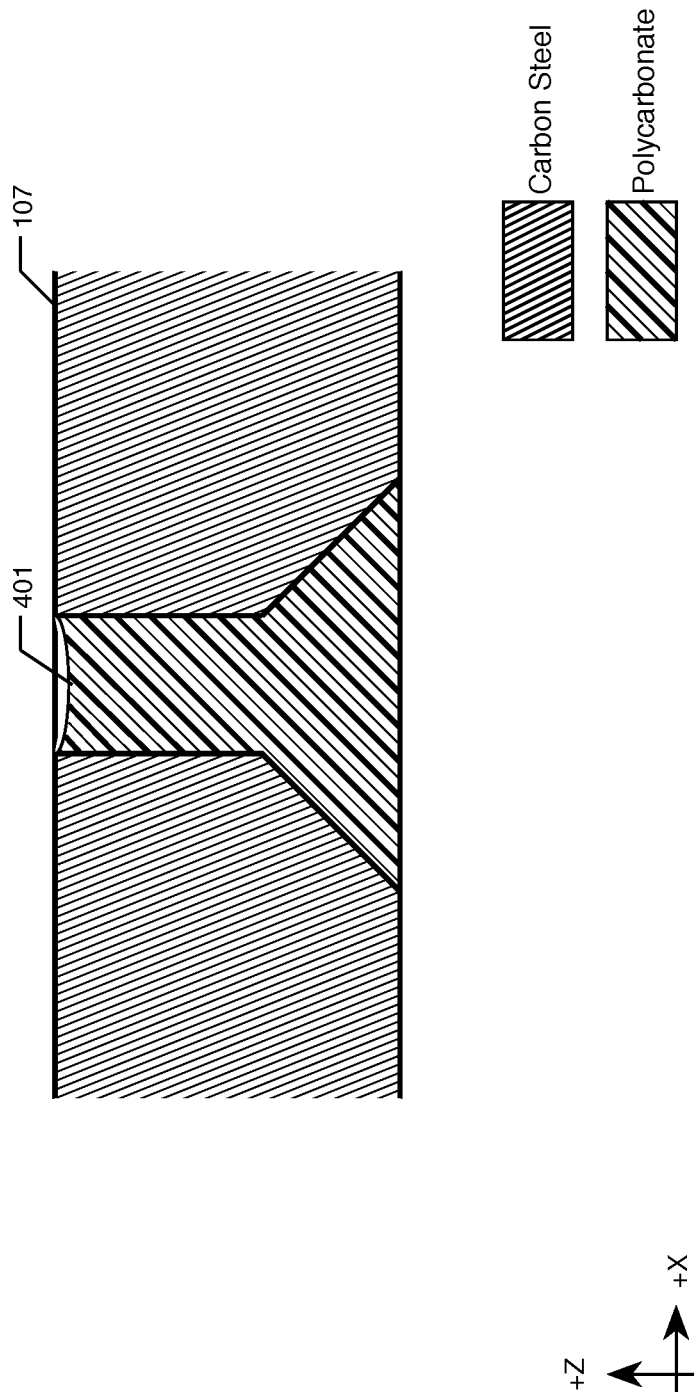
FIG. 9 depicts an orthogonal front view of circular adhesive island 401 along cross-section AA-AA, in which the plug has a concave surface.
Figure 10:
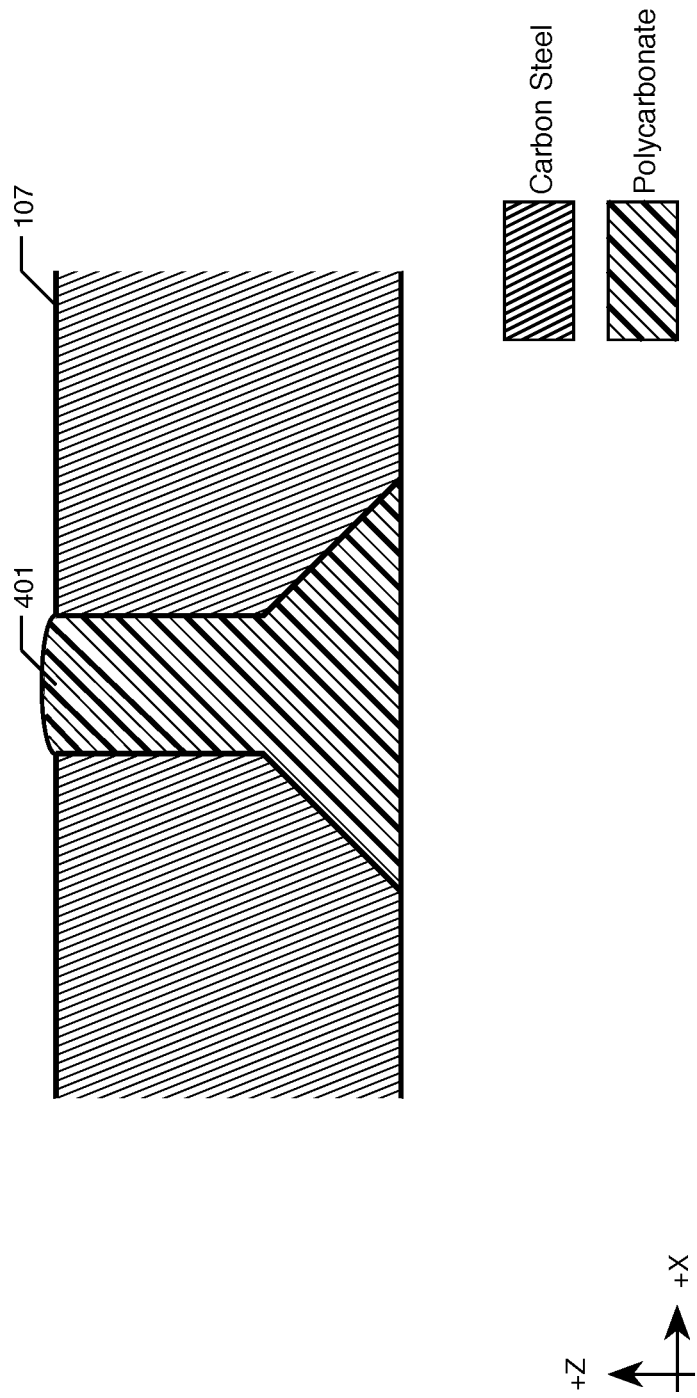
FIG. 10 depicts an orthogonal front view of circular adhesive island 401 along cross-section AA-AA, in which the plug has a convex surface.

In accordance with the illustrative embodiment, each hole is completely filled so that the polycarbonate is flush with the obverse and reverse surface of build plate 107 (as shown in FIG. 5). It will be clear to those skilled in the art, however, after reading this disclosure, how to make and use alternative build plates in which one or more holes is concave and below the obverse surface (as shown in FIG. 9), or be convex and above the obverse surface (as shown in FIG. 10).

It will be clear to those skilled in the art, after reading this disclosure how to make and use alternative embodiments of the present invention in which some or all of the adhesive islands do not comprise a chamfer (e.g., are straight bored, are counterbored, etc.). Furthermore, it will be clear to those skilled in the art, after reading this disclosure, how to make and use alternative embodiments of the present invention in which some or all of the adhesive islands comprises a chamfer with a different chamfer angle.

It will be clear to those skilled in the art, after reading this disclosure, how to make and use build plate 107.

Figure 6:
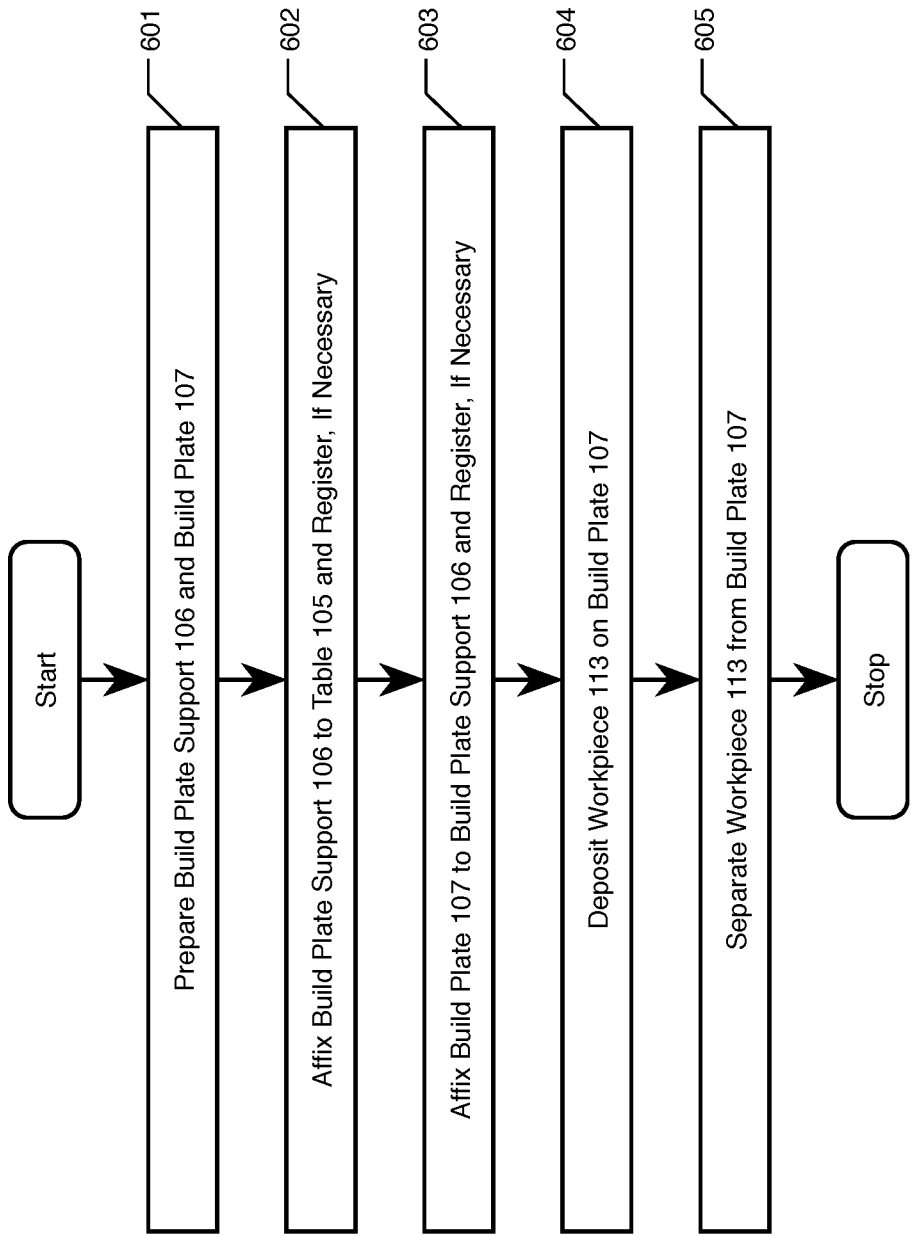
FIG. 6 depicts a flowchart of the operation of the illustrative embodiment of the present invention.

FIG. 6 depicts a flowchart of the operation of the illustrative embodiment of the present invention.

At task 601, build plate support 106 and build plate 107 are prepared. Task 601 is described in detail below and in the accompanying figures.

At task 602, build plate support 106 is affixed to table 105 and registered, if necessary, so that the coordinate system of build plate support 106 corresponds to the coordinate system of table 105. It will be clear to those skilled in the art how to perform task 602.

At task 603, build plate 107 is affixed to build plate support 106 and registered, if necessary, so that the coordinate system of build plate 107 corresponds to the coordinate system of table 105. This is necessary because controller 109 must know the exact coordinates in three-dimensional space of each location on build plate 107, in general, but also the exact coordinates in three-dimensional space of each adhesive island in particular. It will be clear to those skilled in the art how to perform task 603.

At task 604, additive manufacturing system 100 prints workpiece 113 onto build plate 107. In particular, some or all of the filaments are deposited so that they begin, traverse, and end on an adhesive island, which provide the filaments with more purchase than the surrounding sea of carbon steel on the obverse surface of build plate 107. It will be clear to those skilled in the art how to perform task 604.

At task 605, workpiece 113 is separated from build plate 107. In accordance with the illustrative embodiment, task 605 is performed by cutting the places where workpiece 113 has adhered to an adhesive island with a thin wire made from tempered high-carbon steel (e.g., a piano wire, etc.). Because workpiece 113 only adheres to build plate 107 at the adhesive islands and not over the whole area of contact, workpiece 113 is easily separated from build plate 107. In some alternative embodiments, workpiece 113 is separated from build plate 107 by cleaving with a wedge. It will be clear to those skilled in the art, after reading this disclosure, how to perform task 605.

Figure 7:
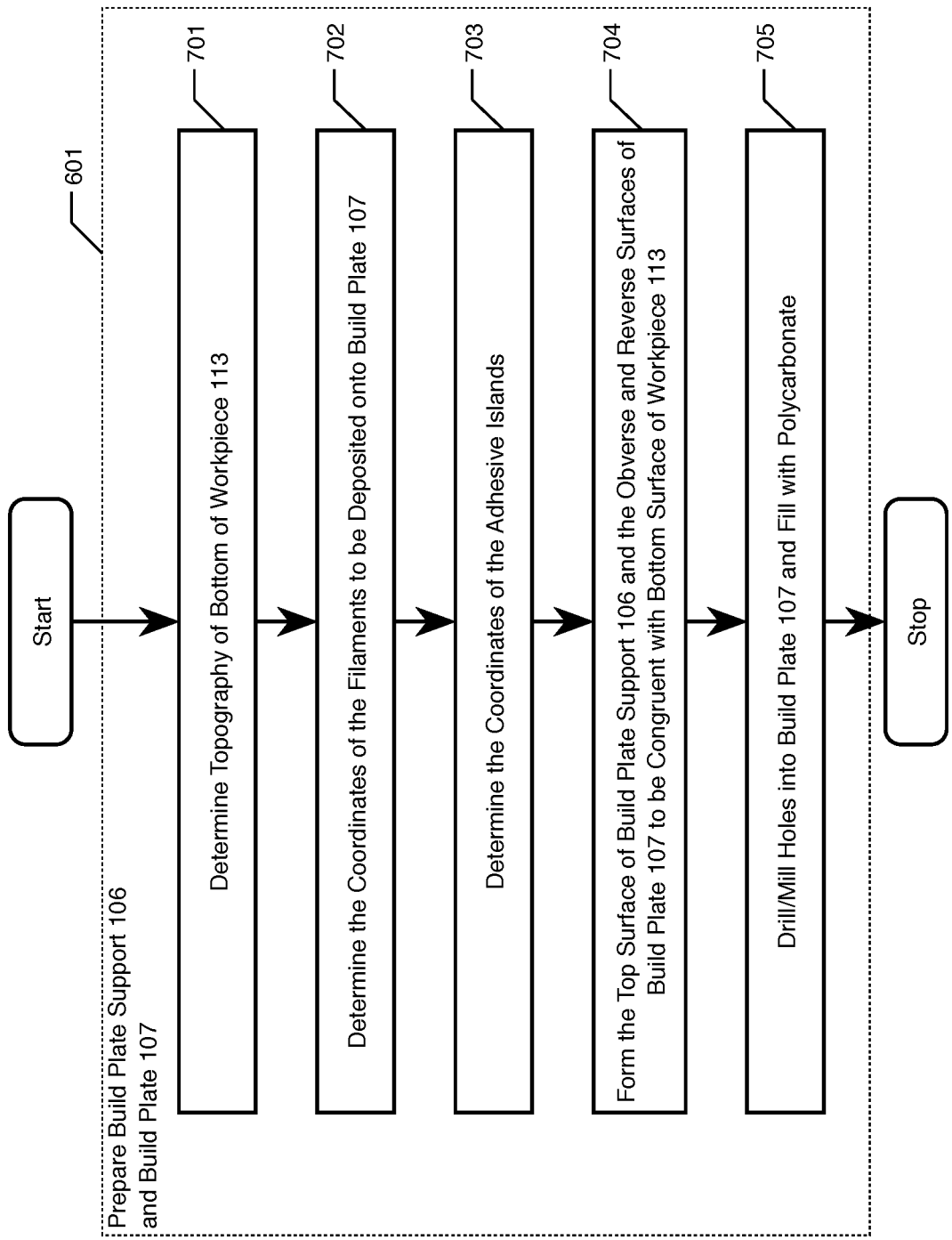
FIG. 7 depicts a flowchart of the details of task 601—preparing build plate support 106 and build plate 107—in accordance with the illustrative embodiment.

FIG. 7 depicts a flowchart of the details of task 601—preparing build plate support 106 and build plate 107—in accordance with the illustrative embodiment.

At task 701, an engineer using computer-aided design software determines the topography of the bottom surface of workpiece 113 (i.e., the surface that will come into contact with the obverse surface of build plate 107). In accordance with the illustrative embodiment, the topography of the bottom of workpiece 113 is given by Equation 1. It will be clear to those skilled in the art how to determine the topography of the bottom of any workpiece.

At task 702, the engineer using computer-aided design software determines the coordinates on the obverse surface of build plate 107 where each filament that will be deposited directly onto build plate 107 begins, ends, and takes sharp turns. In accordance with the illustrative embodiment, the coordinates of the filaments to be deposited directly onto build plate 107 are listed in a table.

Figure 8:
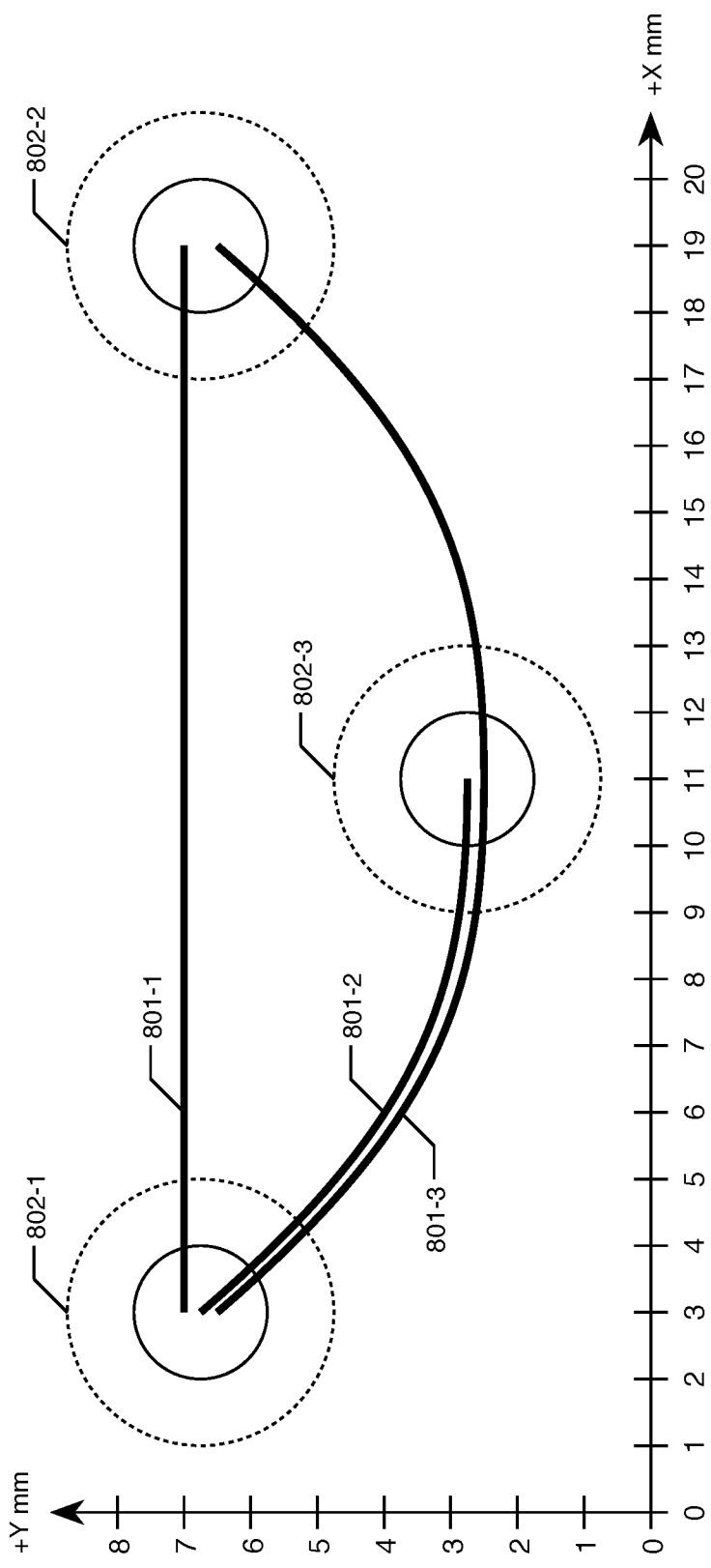
FIG. 8 depicts the spatial layout of three filaments to be deposited on a build plate.

For example, FIG. 8 depicts the spatial layout of three filaments to be deposited on a build plate, and Table 1 lists the coordinates where each of these filaments begins, ends, and takes sharp turns.

TABLE 1

List of Filaments and Their Beginning, Ending, and Turn Coordinates

| Filament | Beginning Coordinate | Ending Coordinate | Turn Coordinate |
|---|---|---|---|
| 801-1 | (3.00 mm, 7.00 mm) | (19.00 mm, 7.00 mm) | N/A |
| 801-2 | (3.00 mm, 6.75 mm) | (11.00 mm, 2.75 mm) | N/A |
| 801-3 | (3.00 mm, 6.50 mm) | (19.00 mm, 6.50 mm) | (11.00 mm, 2.50 mm) |

It will be clear to those skilled in the art how to determine the coordinates of the filaments to be deposited directly onto any build plate.

At task 703, the engineer using computer-aided design software determines:
  (i) how many adhesive islands should build plate 107 have to ensure the lateral anchoring of all of the filaments deposited directly onto build plate 107, and
  (ii) what the type of adhesive island each should be (e.g., circular, elongate, curved, etc.), and
  (iii) what the dimensions of each adhesive island should be (e.g., 1 mm diameter circular, 1 mm by 5 mm elongate, etc.), and
  (iv) the location of each adhesive island on build plate 107,
based on the list of filaments and their beginning, ending, and turn coordinates. In accordance with the illustrative embodiment, this information is listed in a table.

For example, FIG. 8 depicts the position of three 2 mm-diameter circular adhesive islands that correspond to the spatial layout of the three filaments described in Table 1, and Table 2 lists the information pertaining to these adhesive islands.

TABLE 2

List of Adhesive Islands

| Adhesive Island | Location | Type | Size |
|---|---|---|---|
| 802-1 | (3.00 mm, 6.75 mm) | Circular | 2 mm diameter w/90° chamfer |
| 802-2 | (19.00 mm, 6.75 mm) | Circular | 2 mm diameter |
| 802-3 | (11.00 mm, 2.75 mm) | Circular | w/90° chamfer 2 mm diameter w/90° chamfer |

It will be clear to those skilled in the art, after reading, this disclosure, how to perform task 703.

At task 704, build plate 107 is formed or pressed so that its obverse surface is congruent with the bottom of workpiece 113 (and as described by Equation 1 and shown in FIGS. 3a, 3b, and 3c), and the top surface of build plate support 106 is milled to be congruent with the reverse surface of build plate 107 (as shown in FIGS. 2a, 2b, and 2c). It will be clear to those skilled in the art how to form a build plate and build plate support in any topography.

At task 705, the holes listed in Table 2 are drilled or milled into build plate 107 (as shown in FIGS. 4a and 4b) and filled with polycarbonate to form a plurality of adhesive islands on the obverse surface of build plate 107. It will be clear to those skilled in the art, after reading this disclosure, how to accomplish perform task 705.

What is claimed is:

1. An article of manufacture comprising:
  a build plate that comprises:
    (i) a foundation of metal that comprises an obverse surface and a reverse surface, and
    (ii) a first thru-hole through the obverse surface and the reverse surface, wherein the first thru-hole comprises a first chamfer in the reverse surface of the foundation, and
    (iii) a first plug of a first thermoplastic in the first thru-hole; and
  a workpiece adjacent to the obverse surface of the foundation, wherein the workpiece comprises a second thermoplastic;
  wherein the workpiece adheres to the foundation with a first tensile pull-off adhesive strength $T_1$ as measured at a first temperature and pressure; and
  wherein the workpiece adheres to the first plug with a second tensile pull-off adhesive strength $T_2$ as measured at the first temperature and pressure, and wherein $T_2 > 0$; and
  wherein the first tensile pull-off adhesive strength $T_1$ is less than the second tensile pull-off adhesive strength $T_2$.

2. The article of manufacture of claim 1:
  wherein the build plate further comprises:
    (iv) a second thru-hole through the obverse surface and the reverse surface of the foundation, wherein the second thru-hole comprises a second chamfer in the reverse surface of the foundation, and
(v) a second plug of the first thermoplastic in the second thru-hole; and
wherein the workpiece adheres to the second plug with a second tensile pull-off adhesive strength $T_2$ as measured at the first temperature and pressure.

3. The article of manufacture of claim 1 wherein the workpiece comprises a plurality of fiber-reinforced thermoplastic filaments.

4. The article of manufacture of claim 1 wherein the first thermoplastic is selected from the group of polycarbonate, acrylonitrile butadiene styrene, polystyrene, polyetherimide, and polyetherimide.

5. The article of manufacture of claim 1 wherein the second thermoplastic is a polyaryletherketone.

6. The article of manufacture of claim 1 wherein the first thru-hole has a circular footprint.

7. The article of manufacture of claim 1 wherein the first thru-hole has a elongate footprint.

8. The article of manufacture of claim 1 wherein the first thru-hole has a curved footprint.

9. The article of manufacture of claim 1 wherein the obverse surface of the foundation is planar.

10. The article of manufacture of claim 1 wherein the obverse surface of the foundation is non-planar.

11. An article of manufacture comprising:
a build plate that comprises:
(i) a foundation of metal that comprises an obverse surface and a reverse surface, and
(ii) a plurality of thru-holes through the obverse surface and the reverse surface, wherein the plurality of thru-holes are arranged in a regular lattice, and
(iii) a plug of a first thermoplastic in each of the plurality of thru-holes; and
a workpiece adjacent to the obverse surface of the foundation, wherein the workpiece comprises a second thermoplastic;
wherein the workpiece adheres to the foundation with a first tensile pull-off adhesive strength $T_1$ as measured at a first temperature and pressure; and
wherein the workpiece adheres to the plug of the first thermoplastic in each of the plurality of thru-holes with a second tensile pull-off adhesive strength $T_2$ as measured at the first temperature and pressure, and wherein $T_2 > 0$; and
wherein the first tensile pull-off adhesive strength $T_1$ is less than the second tensile pull-off adhesive strength $T_2$.

12. The article of manufacture of claim 11 wherein the first thermoplastic is selected from the group of polycarbonate, acrylonitrile butadiene styrene, polystyrene, polyetherimide, and polyetherimide.

13. The article of manufacture of claim 11 wherein the second thermoplastic is a polyaryletherketone.

14. The article of manufacture of claim 11 wherein each of the plurality of thru-holes is a countersunk thru-hole with a chamfer in the reverse surface of the plate.

15. The article of manufacture of claim 11 wherein each of the plurality of thru-holes has a circular footprint.

16. The article of manufacture of claim 11 wherein each of the plurality of thru-holes has an elongate footprint.

17. The article of manufacture of claim 11 wherein each of the plurality of thru-holes has a curved footprint.

18. The article of manufacture of claim 11 wherein the obverse surface is planar.

19. The article of manufacture of claim 11 wherein the obverse surface is non-planar.

* * * * *